United States Patent
Prasad et al.

(10) Patent No.: US 8,023,581 B2
(45) Date of Patent: Sep. 20, 2011

(54) MAX-LOG RECEIVER FOR MULTIPLE-INPUT MULTIPLE-OUTPUT (MIMO) SYSTEMS

(75) Inventors: Narayan Prasad, Plainsboro, NJ (US); Xiaodong Wang, New York, NY (US); Mohammad Madihian, Plainsboro, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 827 days.

(21) Appl. No.: 11/857,269

(22) Filed: Sep. 18, 2007

(65) Prior Publication Data

US 2008/0225974 A1 Sep. 18, 2008

Related U.S. Application Data

(60) Provisional application No. 60/826,119, filed on Sep. 19, 2006.

(51) Int. Cl.
*H04L 23/02* (2006.01)
*H04L 27/06* (2006.01)

(52) U.S. Cl. ........................................ 375/262; 375/241

(58) Field of Classification Search .................. 375/262, 375/341; 714/786, 794
See application file for complete search history.

(56) References Cited

U.S. PATENT DOCUMENTS

| | | | |
|---|---|---|---|
| 6,865,712 B2 | 3/2005 | Becker | |
| 6,993,098 B2 | 1/2006 | He | |
| 7,266,168 B2 * | 9/2007 | Kwak et al. | 375/347 |
| 7,463,703 B2 * | 12/2008 | McElwain | 375/341 |
| 7,567,635 B2 * | 7/2009 | Scheim et al. | 375/341 |
| 7,639,760 B2 * | 12/2009 | Kim | 375/341 |
| 7,724,832 B2 * | 5/2010 | Hosur et al. | 375/260 |

* cited by examiner

*Primary Examiner* — Khanh C Tran
(74) *Attorney, Agent, or Firm* — Joseph Kolodka

(57) ABSTRACT

A method includes the steps of i) listing out all possibilities for a first symbol of a two stream signal; ii) determining a second symbol of the two stream signal for each of the first symbol listed out, iii) evaluating a metric for each of the first symbol and second symbol pair, iv) listing out all possibilities for second symbol, v) determining a first symbol for each choice of the second symbol listed out, vi) evaluating a metric for each of the second symbol and first symbol pair, vii) determining an exact maximum log likelihood ratio for all bits using the metrics, and viii) decoding codeword(s) in the two stream signal using the determined exact maximum log likelihood ratio for all bits.

7 Claims, 4 Drawing Sheets

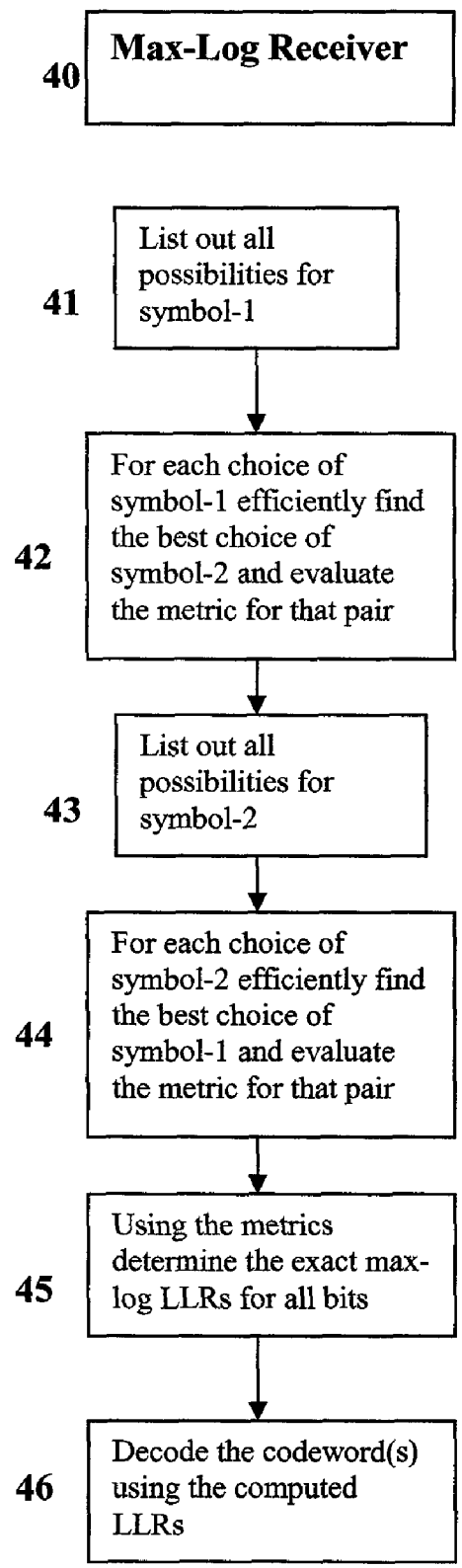
Fig. 4 Max-Log Receiver

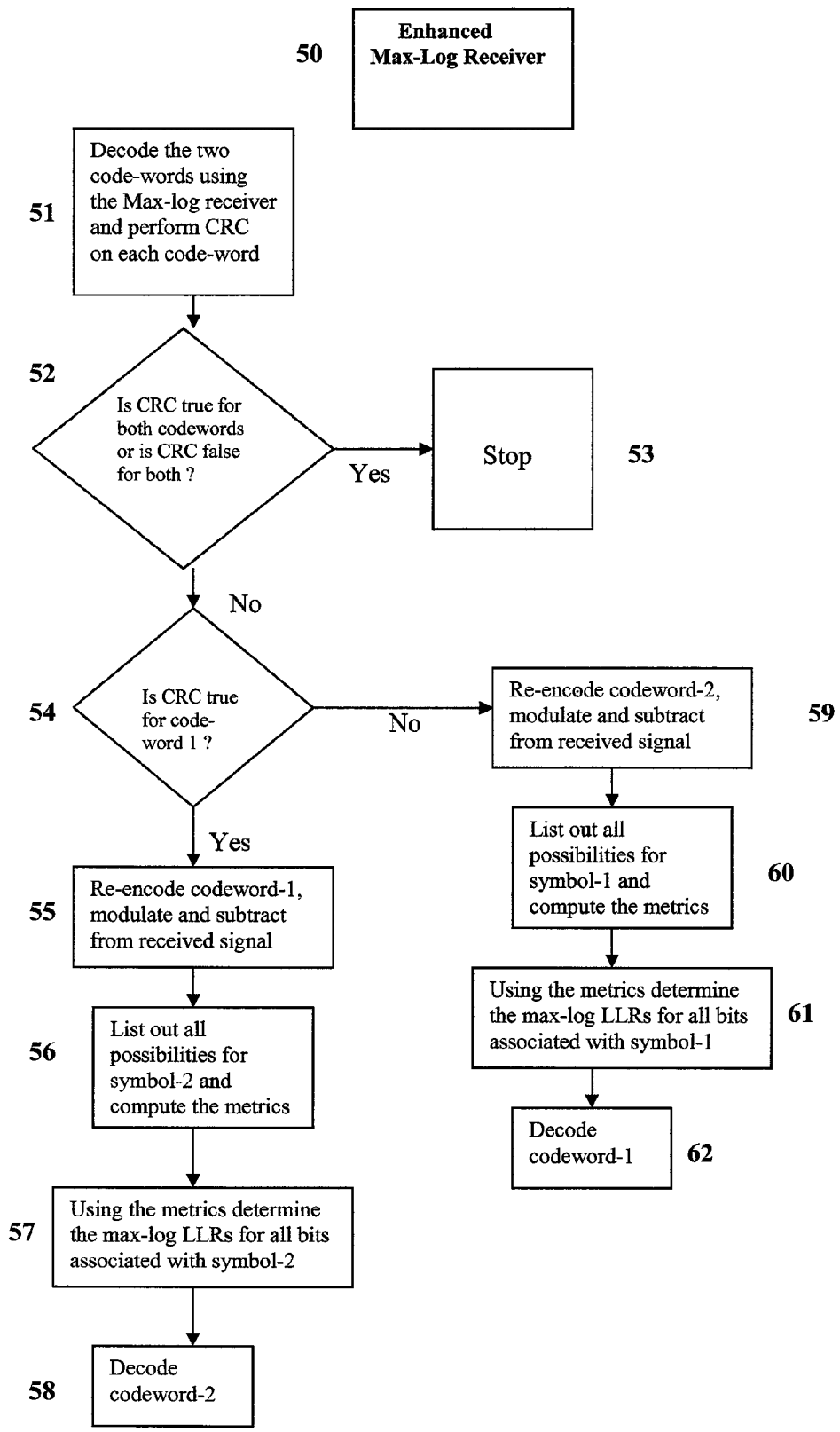
Fig. 5 Enhanced Max-Log Receiver

MAX-LOG RECEIVER FOR MULTIPLE-INPUT MULTIPLE-OUTPUT (MIMO) SYSTEMS

This application claims the benefit of U.S. Provisional Application No. 60/826,119, entitled "Novel two Stream Receivers For MIMO systems and their Extensions", filed on Sep. 19, 2006, the contents of which is incorporated by reference herein.

BACKGROUND OF THE INVENTION

The present invention relates generally to mobile communications, and, more particularly, to two-stream receivers for multiple-input multiple-output MIMO systems and their extensions.

In order to meet the ambitious spectral efficiency targets set for Evolved-UMTS Terrestrial Radio Access (EUTRA), low-latency and low complexity receivers are necessary. Such receivers are particularly needed at the user equipment (UE) where the complexity constraints are much more stringent. The most important scenario in the multiple antenna downlink system involves UEs with two antennas, where the basestation or the Node-B transmits two encoded streams to a scheduled UE.

A known brute force maximum likelihood ML reception method 10 for two streams, depicted in FIG. 1, involves listing all possible pairs for symbols 1 and 2 11, evaluating the metric for each pair 12, using the metrics to determine the exact max-log LLRs (maximum log likelihood ratios) for all the bits 13 and decoding the codeword(s) using the computing LLRs 14. Although the brute force ML method provides optimal demodulation it is highly complex.

The main competing demodulators to the invention are the Deterministic Sequential Monte-Carlo (D-SMC) based receiver (another promising low-complexity receiver), shown in FIG. 2, and the successive interference cancellation SIC receiver, shown in FIG. 3.

Complexity reduction is achieved with the D-SMC method by computing the soft output for each coded bit over only a reduced set of hypotheses. The price paid for this complexity reduction is that the D-SMC suffers from a problem, usually referred to as the "missing candidate problem", in that the hypotheses (or candidates) necessary for computing the soft outputs for some of the bits may not be present in the reduced set. This missing candidate problem can cause significant degradation in the performance particularly if the reduced set is relatively small compared to the set of all hypotheses. Heuristic techniques to alleviate this problem in the D-SMC have also been proposed but such techniques require a lot of system or scenario specific fine tuning and may not work well under across all conditions.

Referring again to FIG. 2, the D-SMC method 20 involves listing out a subset of possible pairs of symbols 1 and 2 for the two streams received 21, evaluating the metric for each pair 22, using the metrics to determine the approximate max-log LLRs for all bits 23 and decoding the codeword(s) using the computed LLRs 24. Although the D-SMC reception method has tunable complexity, it also has sub-optimal demodulation due to "missing" candidate problem.

In contrast to the D-SMC reception method, the SIC receiver is a sequential receiver where one stream is first decoded and subtracted from the received signal before decoding the second stream. The soft output for the first stream is obtained after assuming the second stream to be a Gaussian interferer which can lead to performance degradation.

Referring again to the FIG. 3, the successive interference cancellation reception method 30 involves suppressing the contribution of symbol-2 via filtering 31, evaluating the metric for all possibilities of symbol-1 32, using the metrics to determine the max-log LLRs for all bits associated with symbol-1 33, decoding the codeword-1 using the computed LLRs 34, re-encoding the codeword which is then modulated and subtracted from the received signal 35, listing out all possibilities for symbol-2 and computing the metrics 36, using the metrics to determine the max-log LLRs for all bits associated with symbol-2 37, and then decoding codeword-2 38.

Accordingly, there is a need for two-stream receivers that are eminently suitable for receivers with low-latency and low complexity necessary to meet the ambitious spectral efficiency targets set for Evolved-UMTS Terrestrial Radio Access (EUTRA).

SUMMARY OF THE INVENTION

In accordance with the invention, a method includes the steps of i) listing out all possibilities for a first symbol of a two stream signal; ii) determining a second symbol of the two stream signal for each of the first symbol listed out, iii) evaluating a metric for each of the first symbol and second symbol pair, iv) listing out all possibilities for second symbol, v) determining a first symbol for each choice of the second symbol listed out, vi) evaluating a metric for each of the second symbol and first symbol pair, vii) determining the exact maximum log likelihood ratio for all bits using the metrics, and viii) decoding codeword(s) in the two stream signal using the determined exact maximum log likelihood ratio for all bits.

In another aspect of the invention, a method includes the steps of i)-viii) to decode the two codewords associated with the two streams ix) conducting a CRC check on the two decoded codewords x) In case the CRC of only one codeword is true, re-encoding, modulating and subtracting that codeword from the received signal to obtain a single stream signal, xi) listing out all possibilities for the remaining symbol in the single stream signal, xii) evaluating a metric for each possibility of the remaining symbol, xiii) determining the maximum log likelihood ratio for all bits using the metrics, and xiv) decoding the remaining codeword in the single stream signal using the determined maximum log likelihood ratio for all bits.

In a preferred extension wherein the steps for two signal stream reception are extended to four signal streams received by splitting the four signal stream demodulation into two smaller two-stream signal demodulations. The two smaller two-stream signal demodulations can be solved sequentially as in successive group decoding or in parallel as in parallel group decoding. The parallel group decoding involves a split of the incoming four-streams (labeled $\{1,2,3,4\}$) into one of the three unordered partitions of $\{1,2,3,4\}$ which are $\{(1,2),(3,4)\}, \{(1,3),(2,4)\}, \{(1,4),(2,3)\}$. The split can be done on a per-tone basis (in an OFDM system with multiple tones) based on the instantaneous channel realizations, taking into account if the four streams are jointly encoded as in the single codeword (SCW) case or if they are independently encoded as in the multiple codeword (MCW) case. The sequential group decoding includes six ways to do the split which correspond to the six ordered partitions of $\{1,2,3,4\}$ which are $\{(1,2),(3,4)\}, \{(3,4),(1,2)\}, \{(1,3),(2,4)\}, \{(2,4),(1,3)\}, \{(1,4),(2,3)\}, \{(2,3),(1,4)\}$, and needs the streams to be independently encoded with the split being common or fixed across all tones to allow post-decoding feedback.

BRIEF DESCRIPTION OF DRAWINGS

These and other advantages of the invention will be apparent to those of ordinary skill in the art by reference to the following detailed description and the accompanying drawings.

FIG. 4 is a flow diagram of max-log two-stream wireless reception, in accordance with the invention.

FIG. 5 is a flow diagram of an enhanced max-log receiver for two stream wireless reception, in accordance with the invention.

DETAILED DESCRIPTION

Figures 1, 2:
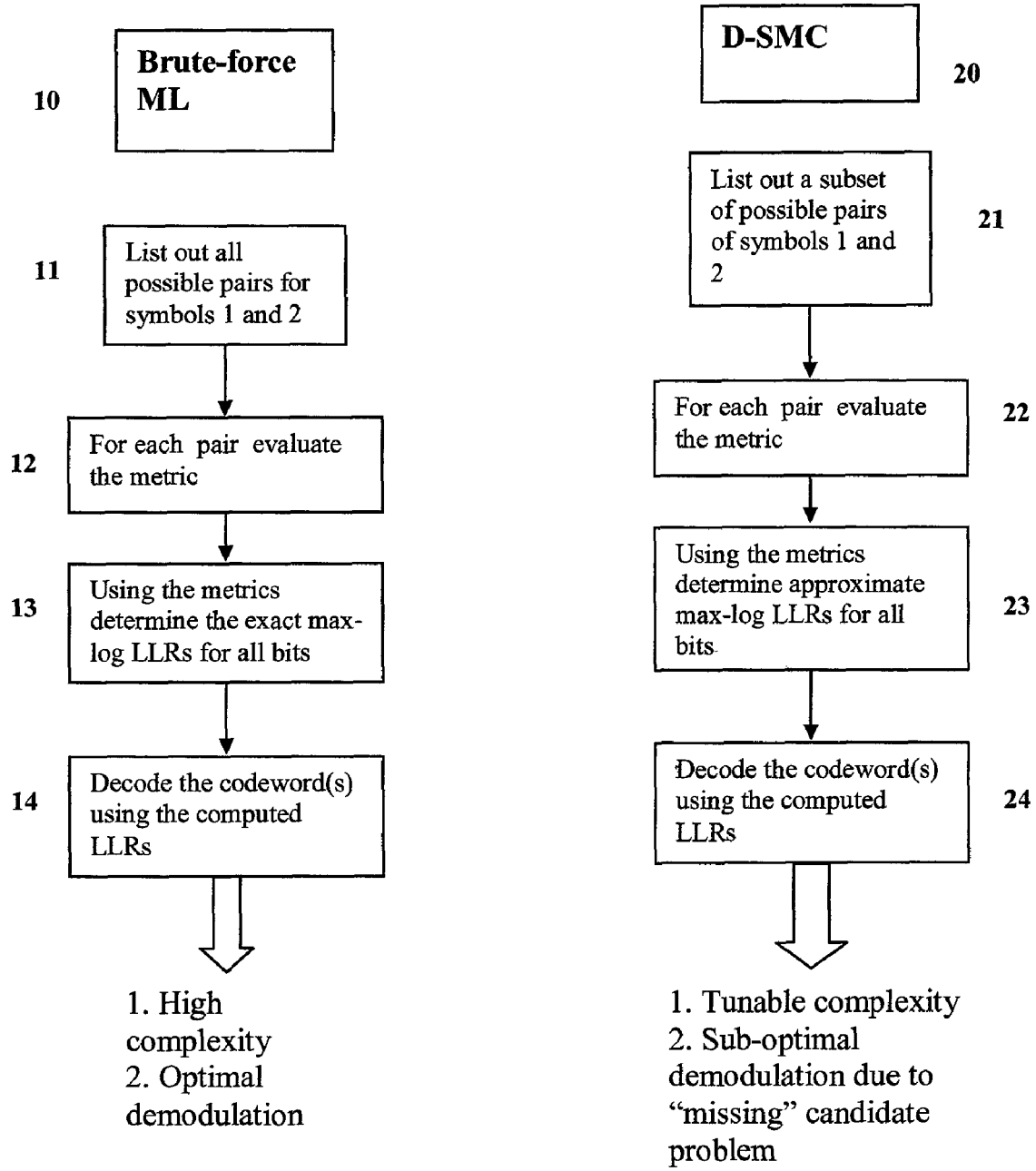
FIG. 1 is a flow diagram of a brute force maximum likelihood two stream wireless reception, in accordance with the prior art.
FIG. 2 is a flow diagram of Deterministic Sequential Monte-Carlo (D-SMC) two stream reception, in accordance with the prior art.
Figure 3:
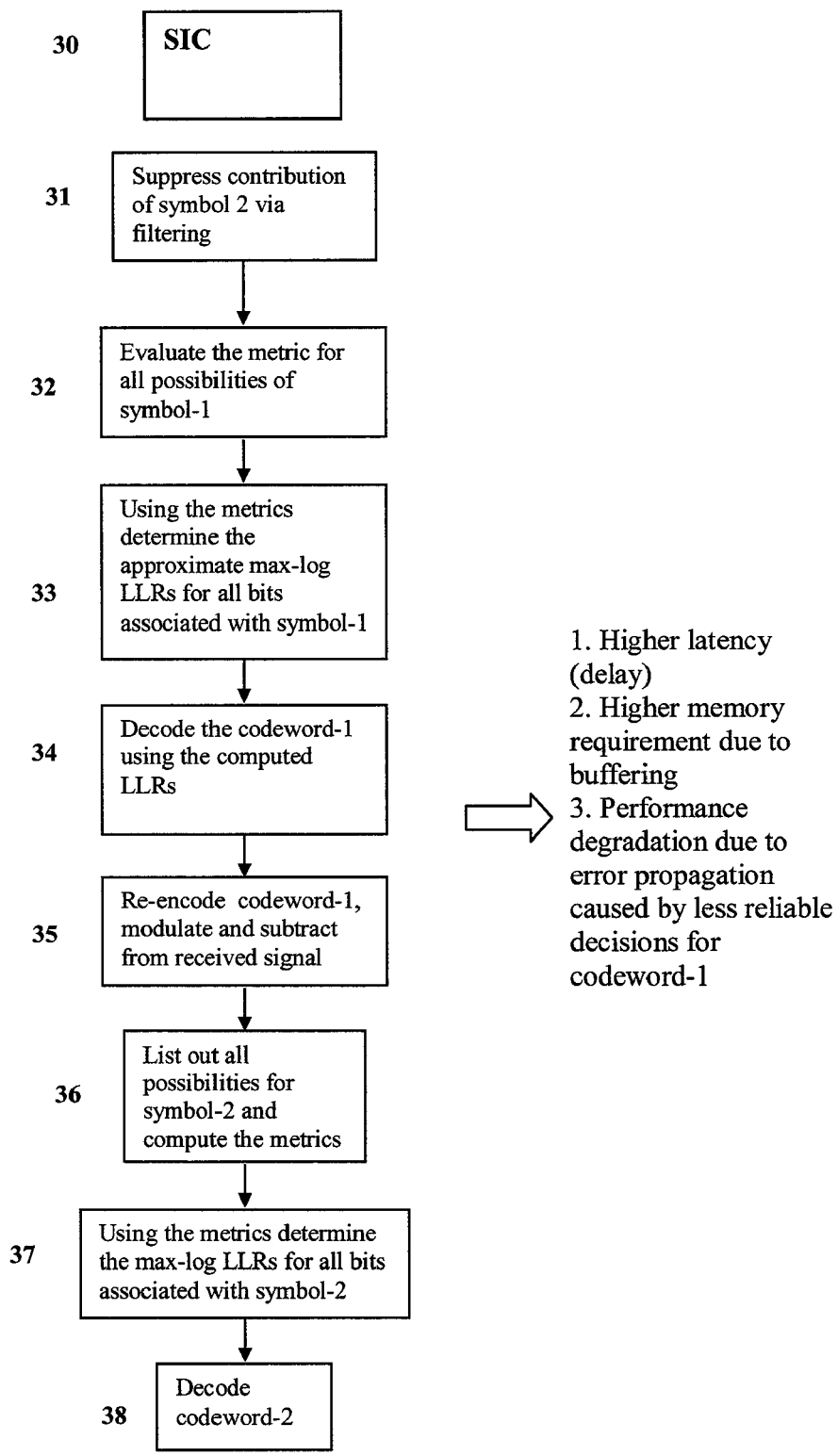
FIG. 3 is a flow diagram of successive interference cancellation (SIC) two stream wireless reception, in accordance with the prior art.

In the context of the invention, the joint demodulation of two streams is considered, each stream comprising of symbols from a constellation of size M. The exact max-log outputs for all 2 log(M) bits per symbol interval is obtained with O(M) complexity by evaluating the metrics of 2M hypotheses, instead of the conventional method of O($M^2$) complexity which evaluates the metrics of all $M^2$ hypotheses. From this basis, the inventive max-log two-stream receiver is presented, which is flow diagramed in FIG. 4.

In another aspect of the invention, there is presented a two-stream enhanced max-log receiver where the max-log receiver is first used to decode the two codewords. In case only one codeword is decoded correctly, the correctly decoded codeword is re-encoded, modulated and subtracted from the received signal. Using the signal so obtained, the remaining codeword (which was erroneously decoded in the first attempt) is again decoded. The inventive enhanced max-log receiver is flow charted in FIG. 5.

Also, described are methods to extend the inventive two-stream receivers to multiple streams, with particular emphasis on the four stream case which is another important scenario.

Referring again to FIG. 4, the inventive max-log reception method 40 includes listing out all possibilities for symbol-1 41, for each choice of symbol-1 efficiently finding the best choice of symbol-2 and evaluating the metric for that pair 42, listing out all possibilities for symbol-2 43, for each choice of symbol-2 efficiently finding the best choice for symbol-1 and evaluating the metric for that pair 44, using the metrics to determine the exact max-log LLRs for all bits 45, and decoding the received codewords using the computed LLRs 46. This inventive max-log reception method provides optimal demodulation with low implementation complexity.

We now describe the inventive two stream max-log demodulator. Consider the model $$y = H \begin{bmatrix} x_1 \\ x_2 \end{bmatrix} + v \quad (1)$$

where, H is the N×2 channel matrix (N≧2), v is the additive noise having i.i.d. zero-mean unit variance Gaussian elements. $x_1$ and $x_2$ are symbols from a common M-QAM constellation. Let H=[$h_1,h_2$] and H=$\|h_2\|^2$ UL be the modified QR decomposition of H with U being a scaled semi-unitary matrix and L being lower triangular with positive diagonal elements. In particular, we obtain U=[$u_1,u_2$] with $$u_1 = \frac{h_1 \|h_2\|^2 - h_2 <h_1, h_2>}{\|h_2\|^2 \sqrt{\|h_1\|^2 \|h_2\|^2 - |<h_1, h_2>|^2}}$$

$$u_2 = \frac{h_2}{\|h_2\|^2}$$

where <$h_1,h_2$>=$h_2^* h_1$ is the (complex) inner product of the two vectors and $$L = \begin{bmatrix} L_{11} & 0 \\ L_{21} & 1 \end{bmatrix}$$

$$L_{11} = \frac{\sqrt{\|h_1\|^2 \|h_2\|^2 - |<h_1, h_2>|^2}}{\|h_2\|^2}$$

$$L_{21} = \frac{<h_1, h_2>}{\|h_2\|^2}$$

Then we obtain $$\begin{bmatrix} z_1 \\ z_2 \end{bmatrix} = U^* y = \begin{bmatrix} L_{11} & 0 \\ L_{21} & 1 \end{bmatrix} \begin{bmatrix} x_1 \\ x_2 \end{bmatrix} + \tilde{v} \quad (2)$$

and note that transformed noise vector $\tilde{v}$ remains white. Let $\{x_{i,j}\}_{j=1}^M$ denote the M-QAM symbols and let $x_i^R, x_i^I$ denote the real and imaginary parts of $x_i, 1 \leq i \leq 2$, respectively. For each $x_{1,j}$ we define the metric $$Q(x_{1,j}) = |z_1 - L_{11} x_{1,j}|^2 + \min_{x_2} |z_2 - L_{21} x_{1,j} - x_2|^2 \quad (2b)$$

Defining $q_{1,j} = z_2 - L_{21} x_{1,j}$ we can express $Q(x_{1,j})$ as $$Q(x_{1,j}) = |z_1 - L_{11} x_{1,j}|^2 + \min_{x_2^R} |q_{1,j}^R - x_2^R|^2 + \min_{x_2^I} |q_{1,j}^I - x_2^I|^2$$

Since both $x_2^R, x_2^I$ belong to a common $\sqrt{M}$-PAM constellation, the two minimizations for computing $Q(x_{1,j})$ can be done in parallel using simple slicing (rounding) operations with O(1) complexity each. All $\{Q(x_{1,j})\}_{j=1}^M$ are efficiently determined using the described method. Also, using the fact that $L_{11}$ is positive along with the symmetry of the M-QAM constellation, we have that $\{L_{11} x_{1,j}^R\}_{j=1}^{\sqrt{M}} = \{L_{11} x_{1,j}^I\}_{j=1}^{\sqrt{M}}$. Then since $$|z_1 - L_{11} x_{1,j}|^2 = |z_1^R - L_{11} x_{1,j}^R|^2 + |z_1^I - L_{11} x_{1,j}^I|^2$$

we have that only $3\sqrt{M}$ (real) multiplications are required to evaluate all $\{|z_1 - L_{11} x_{1,j}|^2\}_{j=1}^M$ instead of 2M complex ones.

Then we obtain another modified QR decomposition H=$\|h_1\|^2$ VR, with V being a scaled semi-unitary matrix and R being upper triangular with positive diagonal elements. In particular, we obtain V=[$v_1, v_2$] with $$v_2 = \frac{h_2 \|h_1\|^2 - h_1 <h_2, h_1>}{\|h_1\|^2 \sqrt{\|h_1\|^2 \|h_2\|^2 - |<h_1, h_2>|^2}}$$

$$v_1 = \frac{h_1}{\|h_1\|^2}$$

where $\langle h_2,h_1\rangle=h_1^*h_2$ is the complex conjugate of $\langle h_1,h_2\rangle$ and $$R = \begin{bmatrix} 1 & R_{12} \\ 0 & R_{22} \end{bmatrix}$$

$$R_{22} = \frac{\sqrt{\|h_1\|^2\|h_2\|^2 - |\langle h_1,h_2\rangle|^2}}{\|h_1\|^2}$$

$$R_{12} = \frac{\langle h_2,h_1\rangle}{\|h_1\|^2}$$

Using V we determine $w=V^*y$ which can be expressed as $$\begin{bmatrix} w_1 \\ w_2 \end{bmatrix} = V^*y = \begin{bmatrix} 1 & R_{12} \\ 0 & R_{22} \end{bmatrix}\begin{bmatrix} x_1 \\ x_2 \end{bmatrix} + \hat{v}$$

Next, for each $x_{2,j}$ we define the metric $$Q(x_{2,j})=|w_2-R_{22}x_{2,j}|^2+\min_{x_1}|w_1-R_{12}x_{2,j}-x_1|^2 \quad (2c)$$

Defining $q_{2,j}=w_1-R_{12}x_{2,j}$, we can express $Q(x_{2,j})$ as $$Q(x_{2,j})=|w_2-R_{22}x_{2,j}|^2+\min_{x_1^R}|q_{2,j}^R-x_1^R|^2+\min_{x_1^I}|q_{2,j}^I-x_1^I|^2$$

Again since both $x_1^R, x_1^I$ belong to a $\sqrt{M}$-PAM constellation, the two minimizations for computing $Q(x_{2,j})$ can also be done as before in parallel using simple slicing operations. All $\{Q(x_{2,j})\}_{j=1}^M$ are efficiently determined using the described method.

The 2M metrics $\{Q(x_{1,j}),Q(x_{2,j})\}_{j=1}^M$ can also be efficiently determined even for other regular constellations. To illustrate, we consider the example of PSK constellation. Let $x_1$ and $x_2$ be symbols from a common unit average energy M-PSK constellation: $\exp(j\sigma_M), \sigma_M \in \{0, 2\pi/M, \ldots, 2\pi(M-1)/M\}$.

Then to efficiently determine $\{Q(x_{1,j})\}$ we re-write equation (2b) as $$Q(x_{1,j})=|z_1-L_{11}x_{1,j}|^2+\min_{x_2}|q_{1,j}-x_2|^2 \quad (3b)$$

and obtain $q_{1,j}$ in its polar form as $q_{1,j}=r_{1,j}\exp(j\alpha_{1,j})$ such that $r_{1,j}>0, \alpha_{1,j}\in[0,2\pi)$. Let $\beta_{1,j}=M\alpha_{1,j}/(2\pi)-\frac{1}{2}$. Then the minimizing $x_2$ in (3b) can now be determined (with $O(1)$ complexity) in closed form and is given by $\exp(2\pi(\lfloor\beta_{1,j}\rfloor+1)/M)$, where $\lfloor\ \rfloor$ denotes the floor operator. Similarly we can efficiently determine minimizing $x_1$ in (2c) with $O(1)$ complexity. In a similar manner the minimizing $x_1$ in (2c) (and the minimizing $x_2$ in (2b)) can be determined efficiently for other regular constellations by exploiting their decision regions.

Now each size M constellation corresponds to $\log(M)$ bits so we need to determine the max-log soft output for $2\log(M)$ bits. The 2M metrics $\{Q(x_{1,j}),Q(x_{2,j})\}_{j=1}^M$ which we efficiently determined are exactly those needed to determine the max-log output for each bit. To see this, suppose bits numbered 1 to $\log(M)$ correspond to symbol $x_1$. Then letting $\lambda_i$ denote the max-log output of the $i^{th}$ bit $b_i$ and assuming equal a-priori probabilities, we have that $$\lambda_i=\|h_2\|^2(\min_{j:b_i=0}Q(x_{1,j})-\min_{j:b_i=1}Q(x_{1,j}))\ldots$$
$$1\leq i\leq \log(M)$$

and $$\lambda_i=\|h_1\|^2(\min_{j:b_i=0}Q(x_{2,j})-\min_{j:b_i=1}Q(x_{2,j}))\ldots \log(M)+$$
$$1\leq i\leq 2\log(M).$$

Thus we have shown that the complexity of our method to determine the max-log output for each of the $2\log(M)$ bits is $O(M)$ instead of the $O(M^2)$ complexity of the usual method. Note that the described method extends in a straightforward manner to the case when the two symbols belong to different constellations.

Further reduction in complexity can be achieved by avoiding the redundant computation in the two modified QR decompositions $H=\|h_2\|^2 UL, H=\|h_1\|^2 VR$. Also considerable reduction in processing delay can be achieved by implementing the computation of $\{Q(x_{1,j})\}_{j=1}^M, \{\lambda_i\}_{i=1}^{\log(M)}$ and $\{Q(x_{2,j})\}_{j=1}^M, \{\lambda_i\}_{i=\log(M)+1}^{2\log(M)}$ in parallel.

The inventive max-log two-stream receiver includes the two-stream demodulator described above along with the outer code (FEC) decoder(s).

Referring again to FIG. 5, the inventive enhanced max-log receiver 50 method for two stream reception includes using the max-log receiver to decode the two codewords and conducting a cyclic redundancy check (CRC) on the two decoded codewords 51, checking if CRC is true for both codewords or if CRC is false for both 52, terminating the decoding process in case the step in 52 is true 53, in case the step in 52 is false checking if CRC for codeword-1 is true 54, in case the step in 54 is true re-encoding the codeword-1 and then modulating and subtracting it from the received signal 55, listing out all possibilities for symbol-2 and computing the metrics 56, using the metrics to determine the max-log LLRs for all bits associated with symbol-2 57, and decoding the codeword-2 using the computed LLRs 58, in case the step in 54 is false re-encoding the codeword-2 and then modulating and subtracting it from the received signal 59, listing out all possibilities for symbol-1 and computing the metrics 60, using the metrics to determine the max-log LLRs for all bits associated with symbol-1 61, and decoding the codeword-1 using the computed LLRs 62. This inventive enhanced max-log receiver method has a higher complexity and latency (delay), a higher memory requirement due to buffering, but improved performance compared to the max-log receiver.

Next, we describe our enhanced max-log receiver. Our enhanced max-log receiver works as follows. We use the previously described max-log receiver to decode the two codewords and conduct a cyclic redundancy check (CRC) on the two decoded codewords. In case CRC is true for both or false for both we stop the decoding process. If CRC is true for codeword-1 (and false for codeword-2), for each symbol interval, we compute $\hat{z}_2=z_2-L_{21}\hat{x}_I$, where $\{\hat{x}_1\}$ correspond to the re-encoded and modulated codeword-1 and the soft-outputs for the second stream (codeword) are obtained as $$Q(x_{2,j})=|\hat{z}_2-x_{2,j}|^2, 1\leq j\leq M$$

$$\lambda_i=\|h_2\|^2(\min_{j:b_i=0}Q(x_{2,j})-\min_{j:b_i=1}Q(x_{2,j}))\ldots \log(M)+$$
$$1\leq i\leq 2\log(M)$$

The obtained LLRs are used to decode the second codeword.

In case CRC is true for codeword-2 (and false for codeword-1), for each symbol interval, we compute $\hat{w}_1=w_1-R_{12}\hat{x}_2$ and the soft-outputs for the first stream (codeword) are obtained as $$Q(x_{1,j})=|\hat{w}_1-x_{1,j}|^2, 1\leq j\leq M$$

$$\lambda_i=\|h_1\|^2(\min_{j:b_i=0}Q(x_{1,j})-\min_{j:b_i=1}Q(x_{1,j}))\ldots$$
$$1\leq i\leq \log(M)$$

The obtained LLRs are used to decode the first codeword.

In order to extend our max-log two-stream receiver to decode larger number of streams, we use the group decoding concept. Although the resulting receivers no longer yield the exact max-log output for each coded bit, nevertheless they provide good performance at low complexity. To illustrate we consider the case of four stream transmission over MIMO-OFDM. Over each of the N tones we have a flat fading MIMO model given by $$y_n = H_n \begin{bmatrix} x_{1,n} \\ x_{2,n} \\ x_{3,n} \\ x_{4,n} \end{bmatrix} + v_n,$$

$$1 \le n \le N$$

We can leverage our two-stream demodulators by splitting the four-stream demodulation problem into two smaller two-stream demodulation problems which are then solved by our two-stream demodulators. Moreover the two smaller problems can be solved sequentially (as in successive group decoding) or in parallel (as in parallel group decoding).

In the parallel case we have three ways to do the split corresponding to the three unordered partitions of $\{1,2,3,4\}$ which are $\{(1,2),(3,4)\}$, $\{(1,3),(2,4)\}$, $\{(1,4),(2,3)\}$. This split can be done on a per-tone basis based on the instantaneous channel realizations taking into account if the four streams are jointly encoded as in the single codeword (SCW) case or if they are independently encoded as in the multiple codeword (MCW) case. Note that in the SCW case only the max-log demodulator can be used in the smaller two-stream problems. To further elaborate, suppose $\{(1,2),(3,4)\}$ is the chosen split on some tone. Then in parallel group decoding, we obtain the LLRs for streams 1 and 2 by using the two-stream demodulator after suppressing the streams 3 and 4 using MMSE filtering and whitening the suppressed interference plus noise. Similarly, we obtain the LLRs for streams 3 and 4 by using the two-stream demodulator after suppressing the streams 1 and 2 using MMSE filtering and whitening the suppressed interference plus noise.

In the sequential case we have six ways to do the split which correspond to the six ordered partitions of $\{1,2,3,4\}$ which are $\{(1,2),(3,4)\}$, $\{(3,4),(1,2)\}$, $\{(1,3),(2,4)\}$, $\{(2,4),(1,3)\}$, $\{(1,4),(2,3)\}$, $\{(2,3),(1,4)\}$. However in this case we need the streams to be independently encoded and the split should be common or fixed across all tones to allow post-decoding feedback. We can use either one of our two 2-stream receivers to decode the two codewords in each one of the two smaller two stream problems. To further elaborate, suppose $\{(1,2),(3,4)\}$ is the chosen split across all tones. Then in successive group decoding, we decode streams 1 and 2 by using the two-stream receivers after suppressing the streams 3 and 4 using MMSE filtering and whitening the suppressed interference plus noise. Then, we subtract the re-constructed streams 1 and 2 from the received signal and decode streams 3 and 4 by using the two-stream receivers after assuming perfect cancellation of streams 1 and 2.

Next, if limited feedback is available, the receiver can pick one out of three unordered partitions per-tone or six ordered partitions (which are fixed across all tones) and inform the transmitter. The transmitter can then employ one codeword within each group and successive group decoding (using the max-log demodulator in each group) can be used at the receiver.

In summary, we considered the two-stream MIMO decoding problem and designed two receivers. The first one is a highly efficient implementation of the maximum likelihood demodulator (MLD) yielding the exact max-log LLR outputs. The second receiver is an enhanced max-log receiver which provides further performance improvements at the expense of higher complexity. Extensions of the inventive two-stream receivers to the general case with multiple streams were also obtained.

The present invention has been shown and described in what are considered to be the most practical and preferred embodiments. It is anticipated, however, that departures may be made therefrom and that obvious modifications will be implemented by those skilled in the art. It will be appreciated that those skilled in the art will be able to devise numerous arrangements and variations which, although not explicitly shown or described herein, embody the principles of the invention and are within their spirit and scope.

What is claimed is:

1. A method comprising the steps of:
   i) listing out all possibilities for a first symbol of a two stream signal;
   ii) determining a second symbol of the two stream signal for each said first symbol listed out,
   iii) evaluating a metric for each said first symbol and second symbol pair,
   iv) listing out all possibilities for second symbol,
   v) determining a first symbol for each choice of said second symbol listed out,
   vi) evaluating a metric for each said second symbol and first symbol pair,
   vii) determining an exact max-log likelihood ratio for each bit using the metrics, and
   viii) decoding codeword(s) in the two stream signal using the determined exact max-log likelihood ratios for all bits.

2. The method of claim 1, wherein said first symbol is designated symbol-1 and said second symbol is designated symbol-2.

3. The method of claim 2, wherein maximum max-log likelihood ratios for 2 Log(M) bits in said two stream signal is obtained with O(M) complexity when symbol-1 and symbol-2 belong to a constellation of cardinality M, said complexity related to evaluating the metrics of 2M hypotheses O(M) denoting that the said complexity scales linearly in M.

4. The method of claim 3, wherein further reduction in said complexity can be achieved by avoiding the redundant computation in the two modified QR decompositions $H=\|h_2\|^2$ UL, $H=\|h_1\|^2$ VR, where the matrix H represents the channel with $h_1$ and $h_2$ denoting its first and second columns, respectively, U and V are scaled semi-unitary matrices and L, R are square lower and upper triangular matrices, respectively.

5. The method of claim 2 wherein the metric for $x_{1,j}$ which is the $j^{th}$ possibility for symbol-1 is defined by $Q(x_{i,j})=|z_1-L_{11}x_{1,j}|^2+\min_{x_2}|z_2-L_{21}x_{1,j}-x_2|^2$ wherein $z_1$ and $z_2$ are obtained by linearly transforming the vector of received observations, $L_{11}$ and $L_{21}$ are elements of a lower triangular matrix obtained using a modified QR decomposition; defining $q_{1,j}=z_2-L_{21}x_{1,j}$ and expressing $Q(x_{1,j})$ as $Q(x_{1,j})=|z_1-L_{11}x_{1,j}|^2+\min_{x_2^R}|q_{1,j}^R-x_2^R|^2+\min_{x_2^I}|q_{1,j}^I-x_2^I|^2$, with $q_{1,j}^R, q_{1,j}^I$ denoting the real and imaginary parts of $q_{1,j}$, respectively, and both $x_2^R, x_2^I$ belonging to a common real-valued constellation, the two minimizations for computing $Q(x_{1,j})$ being done in parallel using simple slicing (rounding) operations each with a complexity independent of the cardinality of the said real-valued constellation.

6. The method of claim 1, wherein said metric for $x_{2,j}$ which is the $j^{th}$ possibility for symbol-2 is based on $Q(x_{2,j})=|w_2-R_{22}x_{2,j}|^2+\min_{x_1}|W_1-R_{12}x_{2,j}-x_1|^2$; wherein $w_1$ and $w_2$ are obtained by linearly transforming the vector of received observations, $R_{12}$ and $R_{22}$ are elements of an upper triangular matrix obtained using a modified QR decomposition; defining $q_{2,j}=w_1-R_{12}x_{2,j}$ and expressing $Q(x_{2,j})$ as $Q(x_{2,j})=|w_2-$ $R_{22}x_{2,j}|^2 + \min_{x_1^R}|q_{2j}^R - x_1^R| + \min_{x_1^I}|q_{2j}^I - x_1^I|^2$, with $q_{2j}^R, q_{2j}^I$ denoting the real and imaginary parts of $q_{2j}$, respectively and both $x_1^R, x_1^I$ belonging to a real-valued constellation, the two minimizations for computing $Q(x_{2,j})$ being done in parallel using simple slicing operations, thereby efficiently determining all $\{Q(x_{2,j})\}_{j=1}^M$.

7. A method comprising the steps of:
  i) using the method in claim 1 to decode the two codewords associated with the two streams
  ii) conducting a redundancy check on the two decoded codewords
  iii) In case the cyclic redundancy check of only one codeword is true, re-encoding, modulating and subtracting that codeword from the received signal to obtain a single stream signal,
  iv) listing out all possibilities for the remaining symbol in the single stream signal,
  v) evaluating a metric for each possibility of the remaining symbol,
  vi) determining the max-log likelihood ratios for all bits using the metrics,
  vii) decoding the remaining codeword in the single stream signal using the determined max-log likelihood ratios for all bits.

* * * * *